US009529617B2

(12) United States Patent
Wang et al.

(10) Patent No.: US 9,529,617 B2
(45) Date of Patent: Dec. 27, 2016

(54) INSTANT VIRTUAL MACHINES

(71) Applicant: CA, INC., Islandia, NY (US)

(72) Inventors: Xiaopin Wang, Beijing (CN); Shisheng Liu, Beijing (CN); Jiaolin Yang, Beijing (CN); Lei Wang, Beijing (CN)

(73) Assignee: CA, Inc., New York, NY (US)

( * ) Notice: Subject to any disclaimer, the term of this patent is extended or adjusted under 35 U.S.C. 154(b) by 306 days.

(21) Appl. No.: 14/221,925

(22) Filed: Mar. 21, 2014

(65) Prior Publication Data

US 2015/0269031 A1 Sep. 24, 2015

(51) Int. Cl.
G06F 7/00 (2006.01)
G06F 17/00 (2006.01)
G06F 9/455 (2006.01)
G06F 11/14 (2006.01)
G06F 11/20 (2006.01)

(52) U.S. Cl.
CPC ....... G06F 9/45558 (2013.01); G06F 11/1484 (2013.01); G06F 11/2028 (2013.01); G06F 11/2038 (2013.01); G06F 2009/45562 (2013.01); G06F 2009/45583 (2013.01); G06F 2201/815 (2013.01)

(58) Field of Classification Search
CPC .............. G06F 9/45558; G06F 9/45533; G06F 11/1469
USPC ........................................................ 707/649
See application file for complete search history.

(56) References Cited

U.S. PATENT DOCUMENTS

| | | | |
|---|---|---|---|
| 2004/0172574 A1* | 9/2004 | Wing | G06F 11/2025 714/4.12 |
| 2008/0155169 A1* | 6/2008 | Hiltgen | G06F 9/5077 711/6 |
| 2009/0172160 A1* | 7/2009 | Klein | G06F 17/30867 709/225 |
| 2009/0300409 A1* | 12/2009 | Bates | G06F 11/008 714/5.1 |
| 2009/0307686 A1* | 12/2009 | Hepkin | G06F 9/45558 718/1 |
| 2011/0107009 A1* | 5/2011 | Scouller | G06F 11/08 711/103 |
| 2012/0017114 A1* | 1/2012 | Timashev | G06F 11/1469 714/15 |
| 2012/0054409 A1* | 3/2012 | Block | G06F 11/1484 711/6 |
| 2012/0110328 A1* | 5/2012 | Pate | G06F 21/6218 713/165 |
| 2012/0179916 A1* | 7/2012 | Staker | G06F 21/53 713/189 |

(Continued)

Primary Examiner — Binh V Ho
(74) Attorney, Agent, or Firm — Myers Bigel, P.A.

(57) ABSTRACT

A resource management node is provided including a processor and a memory. The memory is coupled to the processor and comprises computer readable program code that when executed by the processor causes the processor to perform operations including creating a recovery virtual machine (VM) for a primary machine for each of a primary machines. The recovery VM is stored in a cache file in a kernel of an operating system. The data in the cache file is stored in a format readable by a virtual hypervisor. The processor is further caused to perform operations including providing the recovery VM from the cache file in the kernel of the operating system upon request when the primary machine fails without conversion of the data in the cache file.

20 Claims, 7 Drawing Sheets

(56) References Cited

U.S. PATENT DOCUMENTS

| | | | |
|---|---|---|---|
| 2013/0019240 A1* | 1/2013 | Tsirkin | G06F 11/1417 718/1 |
| 2013/0111474 A1* | 5/2013 | Agarwal | G06F 9/45558 718/1 |
| 2013/0262390 A1* | 10/2013 | Kumarasamy | H04L 41/08 707/649 |

* cited by examiner

1297

| Block # | 1 | 2 | 3 | 4 | ... | n |
|---------|---|---|---|---|-----|---|
| Read | 1 | 0 | 0 | 0 | | 0 |
| Not Read | 0 | 0 | 0 | 0 | | 0 |
| Modified | 1 | 0 | 0 | 0 | | 0 |

*FIGURE 12*

INSTANT VIRTUAL MACHINES

BACKGROUND

The present inventive concept relates to computer systems and, in particular, to backing up physical and virtual machines in a distributed computer system.

Distributed computing systems, sometimes also referred to as cloud computing systems, are used to provide services to electronic devices which may be operated by end users. In a cloud computing system, the physical machine architecture is hidden from the end user. The physical machines can include servers, network storage devices, computing devices, network routers, network gateways, wireless/wired network interface devices, etc. However, because services are deployed on a physical machine architecture which is hidden from end users, it can be managed, upgraded, replaced or otherwise changed by a system administrator (operator) without the end users being aware of or affected by the change.

Data servers and associated network communication devices are example physical machines that can be included in a data center. The data servers perform computer operations that provide a plurality of guest virtual machines (VMs) within a plurality of VM clusters. Each VM cluster can include a plurality of guest VMs, and each VM cluster can reside on different data servers or may be distributed across more than one data server.

Thus, much of the data for any distributed computing system is now held in VMs, i.e. virtual machines including virtualized data and applications. When the physical machine or the VM fails, it has to be recreated from a backup. Tools designed for backing up physical machines are not easily adapted for backing up VMs. Using these legacy backup tools to backup a virtual environment may cause issues related to capabilities of the backup tools, over complicated fixes to retrofit the tools and the cost associated therewith, which may force organizations to make compromises that reduce the likelihood of realizing the full potential of their virtualization investments.

Companies, such as Veeam Software AG of Switzerland and and CA Technologies of New York, provide backup and replication tools designed for the virtual environment rather than traditional backup tools designed to work with only physical machines. However, improved backup tools for both physical and virtual machines may be desirable.

BRIEF DESCRIPTION OF THE DRAWINGS

Aspects of the present inventive concept are illustrated by way of example and are not limited by the accompanying drawings. In the drawings:

FIG. 12 is an example bitmap used by a cache file in accordance with some embodiments of the present inventive concept.

SUMMARY

Figure 1:
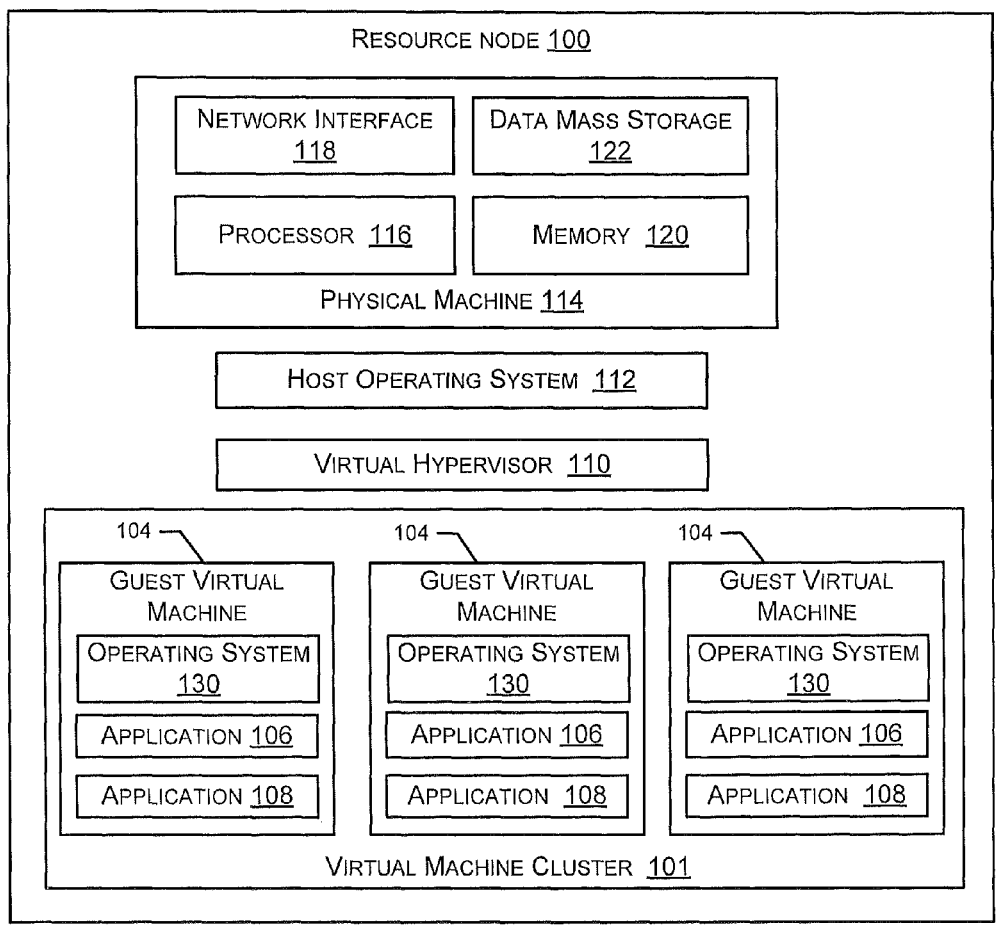
FIG. 1 is a block diagram illustrating a resource node, used in a distributed computing system, in accordance with some embodiments of the present inventive concept.

Some embodiments of the present inventive concept provide resource management nodes including a processor and a memory. The memory is coupled to the processor and comprises computer readable program code that when executed by the processor causes the processor to perform operations including creating a recovery virtual machine (VM) for a primary machine for each of a plurality primary machines. The recovery VM is stored in a cache file in a kernel of an operating system. The data in the cache file is stored in a format readable by a virtual hypervisor. The processor is further caused to perform operations including providing the recovery VM from the cache file in the kernel of the operating system upon request when the primary machine fails without conversion of the data in the cache file.

Further embodiments of the present inventive concept provide methods and computer program products associated with the resource node.

DETAILED DESCRIPTION

In the following detailed description, numerous specific details are set forth in order to provide a thorough understanding of embodiments of the present inventive concept. However, it will be understood by those skilled in the art that the aspects of the present inventive concept may be practiced without these specific details. In other instances, well-known methods, procedures, components and circuits have not been described in detail so as not to obscure the present inventive concept. It is intended that all embodiments disclosed herein can be implemented separately or combined in any way and/or combination.

As discussed above, data for any distributed computing system is held in both physical and virtual machines (VMs), i.e. virtual machines including virtualized data and applications. When the primary machine fails, it has to be recreated from a backup version. As used herein, "primary machine" refers to a primary physical machine or a primary virtual machine without departing from the scope of the present inventive concept. Thus, tools are needed for backing up both physical and virtual machines. Tools designed for backing up physical machines are not easily adapted for backing up VMs. Using these legacy backup tools to backup a virtual environment may cause issues related to capabilities of the backup tools, over complicated fixes to retrofit the tools and the cost associated therewith, which may force organizations to make compromises that reduce the likelihood of realizing the full potential of their virtualization investments.

If the primary machine fails, there are systems and methods that allow users to start a machine from backup sessions. For example, ArcServe offered by CA Technologies of New York, the Assignee of the present application, offers this functionality in its "virtual standby" feature. However, before the primary machine or VM can be started from the backup session, a conversion from the backup sessions to a file format, such as virtual machine disk (VMDK) or virtual hard disk (VHD/VHDX) readable by the virtual hypervisor takes place. The time period involved in this conversion can be very long.

Accordingly, some embodiments of the present inventive concept provide systems, methods and computer program products for instant VM. As used herein, "instant VM" refers recreating a primary machine from a backup session without having to wait an extended period of time for conversion from the backup session to a file format readable by the virtual hypervisor. As used herein, "without significant delay" refers to a delay that is less than a delay that would be caused by having to translate the data in a file to a format that is directly readable by the hypervisor. As will be discussed further herein with respect to FIGS. 1 through 12, some embodiments of the present inventive concept may convert VM images on demand, which may save VM start up time from backup sessions.

As discussed above, some embodiments of the present inventive concept work in combination with VDMK and VHD/VHDX file formats. VMDK is a file format developed for virtual applications. The format is a container for virtual hard disk drives to be used in virtual machines. A VHD/VHDX is a file format which represents a virtual hard disk drive (HDD). It may contain what is found on a physical HDD, such as disk partitions and a file system, which in turn can contain files and folders. It is typically used as the hard disk of a virtual machine. Although embodiments of the present inventive concept are discussed with respect to VMDK and VHD/VHDX file formats, embodiments of the present inventive concept are not limited thereto. Any file format that lends itself to virtual machines can be used without departing from the scope of the present inventive concept.

Details of the present inventive concept will be discussed further below after the following explanation of an example resource node and distributed computing system in which the operations of the present inventive concept with respect to instant VMs may be performed.

Resource Node of a Distributed Computing System

Referring first to FIG. 1, a block diagram of a resource node 100 in accordance with some embodiments will be discussed. As illustrated in FIG. 1, a resource node 100 of a distributed computing system includes a physical machine 114 that performs computer operations to provide one or more VM clusters 101. Each of the VM clusters includes a plurality of guest VMs 104. Each guest VM 104 runs a guest operating system 130 and a plurality of applications 106 and 108. The computing needs of users 102 (e.g., humans and/or other virtual/non-virtual machines) drive the functionality of the VM cluster 101 and guest VMs 104 thereof. A virtual hypervisor 110 can provide an interface between the VM cluster 101 and a host operating system 112 and allows multiple guest operating systems 130 and associated applications 106 and 108 to run concurrently. The host operating system 112 is responsible for the management and coordination of activities and the sharing of the computer resources of the physical machine 114.

The physical machine 114 may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical machine 114 may include computer resources such as: processor(s) 116 (e.g., central processing unit, CPU); network interface(s) 118; memory device(s) 120; data mass storage device(s) 122 (e.g., disk drives, solid state nonvolatile memory, etc.); etc. The processor(s) 116 is configured to execute computer program code from the memory device(s) 120, discussed below as a computer readable storage medium, to perform at least some of the operations disclosed herein.

Besides acting as a host for computing applications 106 and 108 that run on the physical machine 114, the host operating system 112 may operate at the highest priority level of the resource node 100, executing instructions associated with the physical machine 114, and it may have exclusive privileged access to the physical machine 114. The host operating system 112 creates an environment for implementing the VM cluster 101 which hosts the guest VMs 104. One host operating system 112 is capable of implementing multiple independently operating VM clusters 101 simultaneously.

The virtual hypervisor 110, which may also be known as a virtual machine monitor or VMM, runs on the host operating system 112 and provides an interface between the VM clusters 101 and the physical machine 114 through the host operating system 112. The virtual hypervisor 110 virtualizes the computer system resources and facilitates the operation of the host guest VMs 104 and associated VM cluster 101. The virtual hypervisor 110 may provide the illusion of operating at a highest priority level to the guest operating system 130. However, the virtual hypervisor 110 can map the guest operating system's priority level to a priority level lower than a top most priority level. As a result, the virtual hypervisor 110 can intercept the guest operating system 130 operations, and execute instructions that require virtualization assistance. Alternatively, the virtual hypervisor 110 may indirectly emulate or directly execute the instructions on behalf of the guest operating system 130. Software steps permitting indirect interaction between the guest operating system 130 and the physical machine 114 can also be performed by the virtual hypervisor 110.

The VMs 104 present a virtualized environment to the guest operating systems 130, which in turn provide an operating environment for the applications 106 and 108, and other software constructs.

Distributed Computing System

Figure 2:
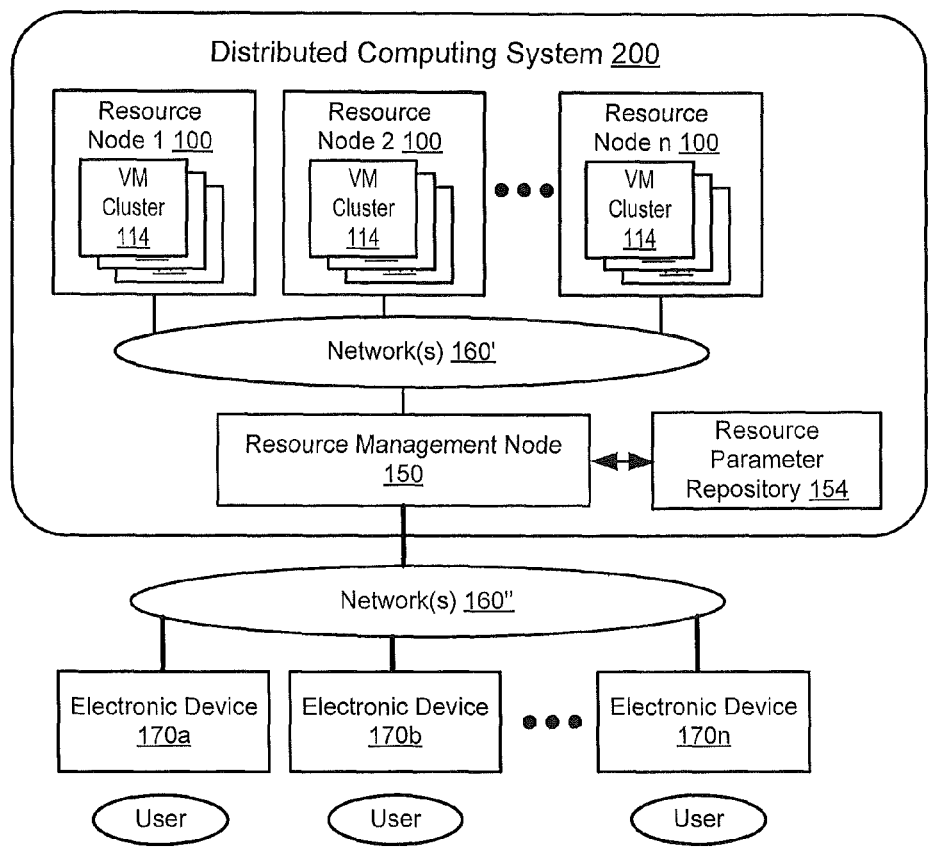
FIG. 2 is a block diagram illustrating a distributed computing system according to some embodiments of the present inventive concept.

Referring now to FIG. 2, a block diagram of a distributed computing system 200 according to some embodiments of the present inventive concept will be discussed. As illustrated in FIG. 2, the distributed computing system 200 receives requests from electronic devices 170a-170n via one or more networks 160'-160" for processing. The electronic devices 170a-170n may be operated by end-users. The distributed computing system 200 includes a plurality of resource nodes 100 and a resource management node 150. The electronic devices 170a-170n may include, but are not limited to, desktop computers, laptop computers, tablet computers, wireless mobile terminals (e.g., smart phones), gaming consoles, networked televisions with on-demand media request capability and the like. The resource nodes 100 may be configured as described herein regarding FIG. 1. For some distributed computing systems 200, the number of resource nodes 100 can number more than a hundred or thousand and the number of electronic devices 170a-n can number more than a thousand or hundred thousand.

The resource management node 150 may operate to distribute individual requests that are received from the electronic devices 170a-n to particular ones of the resource nodes 100 selected for processing. The resource management node 150 may select among the resource nodes 100 and/or applications hosted on VM clusters 101 of the resource nodes 100 for distributing individual requests responsive to the present loading of the resource nodes 110 and/or the VM clusters 101. The loading may be determined based on the amount of processing resources, volatile memory resources, non-volatile mass storage resources, communication resources, and/or application resources that are utilized to process the requests. The resource management node 150 may, for example, operate to distribute the requests responsive to comparison of the relative loading characteristics of the resource nodes 100. The resource management node 150 may attempt to obtain a more balanced loading across the resource nodes 100 to avoid one of the resource nodes 100 operating at more than a threshold loading above other ones of the resource nodes 100.

Example Resource Management Node

Figure 3:
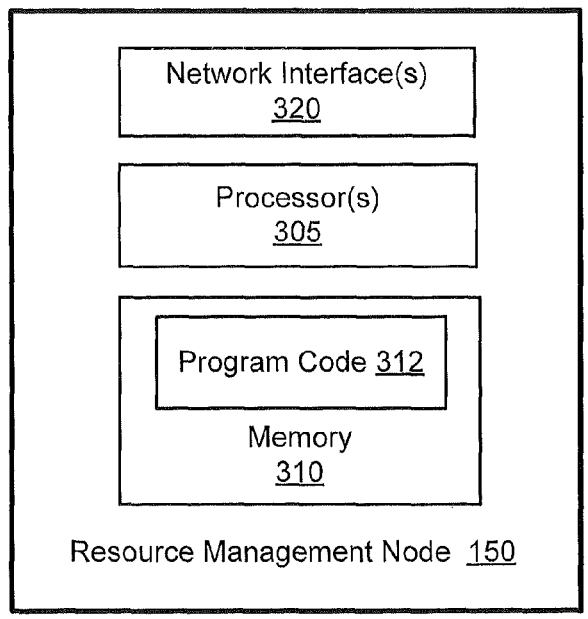
FIG. 3 is a block diagram of a resource management node according to some embodiments of the present inventive concept.

FIG. 3 is a block diagram of a resource management node 150 that is configured to perform the operations of one of more of the embodiments disclosed herein. The resource management node 150 can include one or more network interfaces 320, one or more processors 300 (referred to as "processor" for brevity), and one or more memories 310 (referred to as "memory" for brevity) containing program code 312.

The processor 300 may include one or more data processing circuits, such as a general purpose and/or special purpose processor (e.g., microprocessor and/or digital signal processor) that may be collocated or distributed across one or more networks. The processor 300 is configured to execute program code 312 in the memory 310, described below as a computer readable medium, to perform some or all of the operations for one or more of the embodiments disclosed herein.

Instant VM System

Figure 4:
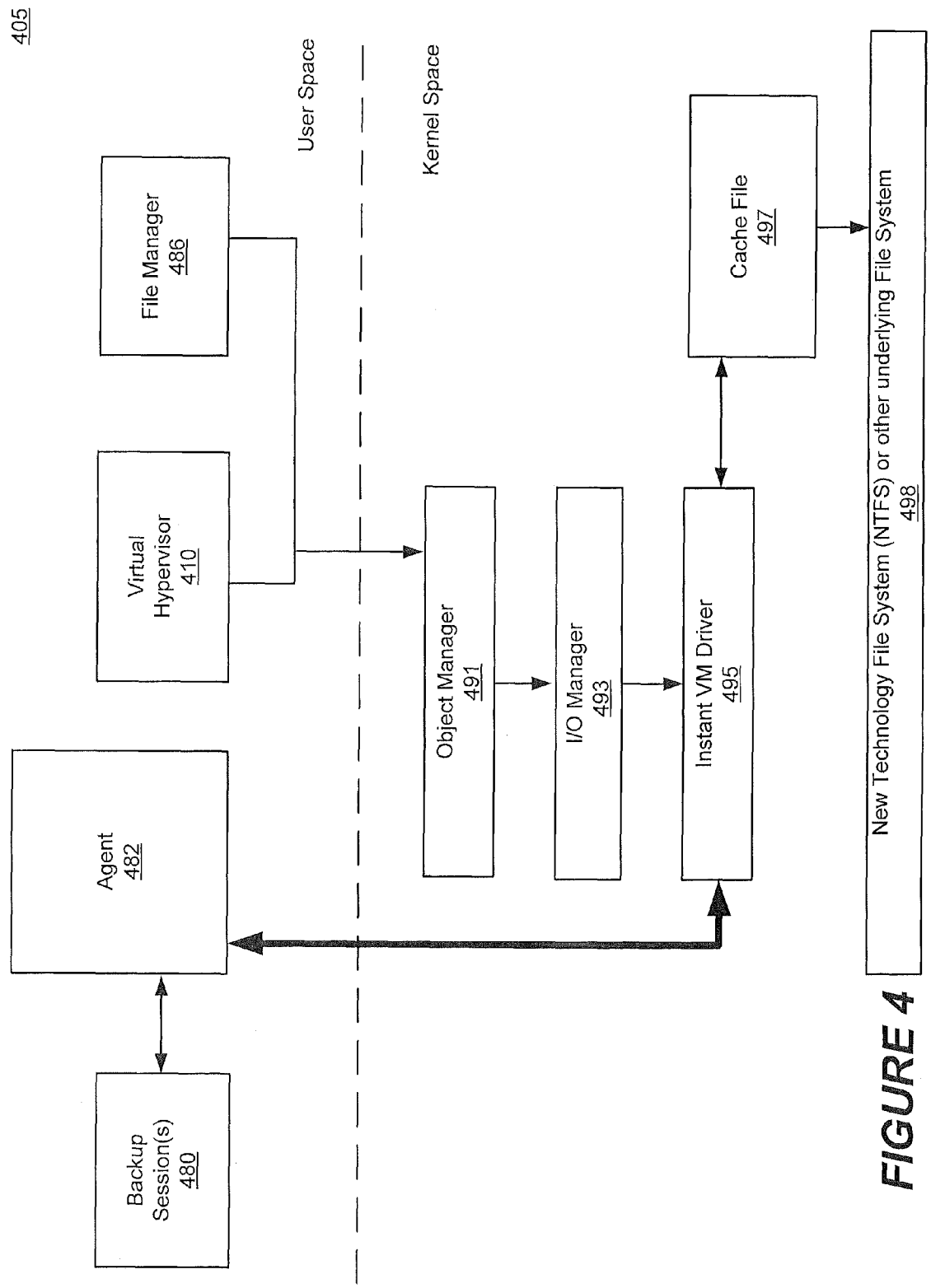
FIG. 4 is a block diagram illustrating a backup system for physical and virtual machines according to some embodiments of the present inventive concept.

Referring now to FIG. 4, a block diagram illustrating a virtual memory 405 in an operating system for instant VM in accordance with some embodiments of the present inventive concept will be discussed. The operating system may be an operating system in a physical machine 114 or in a guest virtual machine 104 as discussed above with respect to FIG. 1 without departing from the scope of the present inventive concept. As illustrated in FIG. 4, the virtual memory 405 is divided into user space and kernel space. Generally, this separation serves to protect data and functionality from faults and malicious behavior. In other words, this separation may provide some protection against user's tampering with the information in the kernel of the operating system. The kernel space is typically reserved for running privileged kernel, kernel extensions, and most device drivers. In contrast, user space is the memory area where application software, for example, file managers such as Explorer, and some drivers execute. Thus, the user space may refer to all code which runs outside the kernel of the operating system. The term "userland" may be used to refer to the various programs and libraries that the operating system uses to interact with the kernel: software that performs input/output operations, manipulates file system objects, application software and the like. Each user space process normally runs in its own virtual memory space, and, unless explicitly allowed, cannot typically access the memory of other processes.

Referring again to FIG. 4, as illustrated, the virtual memory 405 includes an Agent 482 in communications with a backup session 480, a virtual hypervisor 410 and a file manager 486 in "userland." The backup session may be, for example, a disk to disk (D2D) backup session. Thus, the disk storing data for the primary machine (physical or virtual) is copied to onto a disk for the backup VM. It will be understood that the term "disk" is used herein to generally refer to a storage medium and could be provided by any storage medium without departing from the scope of the inventive concept.

D2D can be used to backup both physicals and virtual machines. D2D provides a fast, simple, and reliable way to protect and recover data associated with a failed machine. D2D tracks changes on a machine at the block level and then backs up only those changed blocks in an incremental fashion. Although embodiments of the present inventive concept are discussed with respect to D2D backup sessions, embodiments of the present inventive concept are not limited to this configuration. Embodiments of the present inventive concept may use any type of suitable backup session without departing from the scope of the present inventive concept.

In some embodiments, a backup VM can be made using an image. An image is a VHD/VHDX file that is used as a template for creating a virtual machine. An image is a template because it doesn't have the specific settings that a configured virtual machine has, such as the computer name and user account settings. Thus, if you want to create multiple virtual machines that are set up the same way, you can capture an image of a configured virtual machine and use that image as a template. Thus, the backup VM may be an image of the primary machine.

Referring again to FIG. 4, the Agent 482 creates a reparse point for the primary machine. The reparse point for the primary machine contains a reparse tag and data which is interpreted by a file system mini-filter in accordance with some embodiments discussed herein. The file system mini-filter is identified by the reparse tag. In some embodiments, the reparse point is a new technology filing system (NTFS) reparse point, which is a type of NTFS file system object. However, embodiments of the present inventive concept are not limited to this configuration.

A program, such as a virtual hypervisor 410 or Explorer 486, calls the primary machine. As illustrated in FIG. 4, the call to open the primary machine passes through the object manager 491 and the input output (I/O) manager 493 and is intercepted by a driver 495 for instant VM, which in some embodiments is provided by driver 495. The driver identifies the reparse point for the primary machine by the reparse tag associated therewith by the Agent 482.

If this is the first call for the primary machine, the driver 495 creates a cache file 497 in its spool for the primary machine. If the primary machine has been previously called, the cache file 497 may already exist, therefore, in this case the driver 495 may just open the cache file 497.

The driver 495 replaces the requested file name of the primary machine with the name of the cache file 497, sets the reparse status and completes the operation without passing the open request to the underlying file system 498. Thus, the cache file 497 acts as a "fake" VMDK or VHD/VHDX file to backup the primary machine. This "fake" file is referred to herein as the "recovery VM." In other words, the cache file 497 is a "fake" backup VM, recovery VM. Accordingly, if the primary machine fails, the recovery VM already in a format readable by the hypervisor 410 may be provided and, therefore, a conversion does not have to be performed on the VMDK/VHD/VHDX to a file format readable by the virtual hypervisor. Thus, the recovery VM be provided without significant delay and may provide an "instant VM." In some embodiments, the underlying file system may be an NTFS system, but is not limited to this system and could be any compatible file system without departing from the scope of the present inventive concept.

From the point where the recovery VM is created (cache file 497), all operations associated with the primary machine are redirected to the cache file 497, which is monitored by the driver 495. Some embodiments of the present inventive concept provide a content bitmap associated with the cache file 497 to track the status of data blocks, for example, whether the data blocks in the cache file have (1) not been read from the D2D sessions; (2) have been read; (3) have been modified and the like. Bitmaps are understood by those having skill in the art and, therefore, the details thereof will not be discussed further herein. Any type of bitmap that can be used to track whether data blocks have been read or modified can be used without departing from the scope if the present inventive concept. For example, an example bitmap is illustrated in FIG. 12. As illustrated therein, the bitmap 1297 includes a listing of all the file blocks (1-*n*) for a particular recovery VM and whether these blocks have been read, not read or modified. The bitmap may include additional information without departing from the scope of the inventive concept.

In particular, the cache file 497 initially includes all the information from the image of the primary machine, thus, once read these original blocks of data from the primary machine/D2D session are indicated in the content bitmap as "read" and some blocks are indicated as "not read." Furthermore, when a write operation is performed with respect to the primary machine, the data in the cache file 497 may be modified accordingly, but the data in the real backup file (D2D session) is not modified so that a backup VM stays in tact. This modification of data blocks may also be tracked in the bitmap associated with the cache file 497.

In particular, in the pre-read callback, the driver 495 retrieves the file blocks not read via the Agent 482. If the requested file blocks are marked as "read" in the content bitmap, the driver 495 passes the read I/O to the underlying file system 498 to retrieve the data from there.

In some embodiments the Agent 482 may be configured to apply a threshold to the cache file 497 such that the cache file 497 will not exceed its limit. For example, a sparse file may be used to keep the cache file 497 from exceeding the threshold. A sparse file is a type of computer file that attempts to use file system space more efficiently when blocks allocated to the file are mostly empty. This may be achieved by writing brief information (metadata) representing the empty blocks to disk instead of the actual "empty" space which makes up the block, using less disk space. The full block size is written to disk as the actual size only when the block contains "real" (non-empty) data. When reading sparse files, the file system transparently converts metadata representing empty blocks into "real" blocks filled with zero bytes at runtime. The application is unaware of this conversion. Most modern file systems support sparse files, including most UNIX variants and NTFS. Finally, a write I/O is directed to the cache file 497, but will not be synchronized back to the D2D session to preserve the backup file.

Thus, as discussed above, embodiments of the present inventive concept use a file system mini-filter to reparse the VMDK or VHD/VHDX to other files with different formats, for example, D2D session. As further discussed above, a cache file in the kernel allows a write I/O to modify the recovery VM without affecting the actual backup VM, for example, the backups in the D2D sessions.

Instant VM Operations

Figure 5:
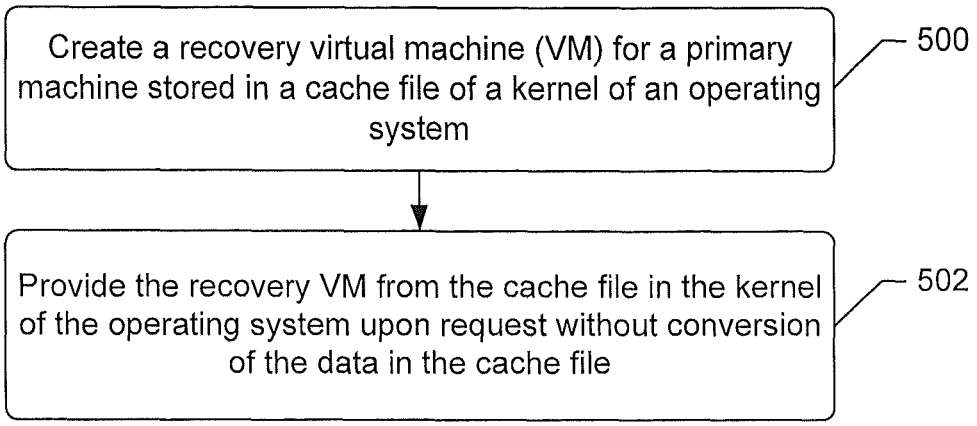
FIGS. 5-11 are flowchart illustrating operations for backing up physical and virtual machines in accordance with some embodiments of the present inventive concept.

FIGS. 5-11 are flowcharts illustrating operations for providing an instant VM in accordance with some embodiments of the present inventive concept. Referring first to FIG. 5, operations begin at block 500 by creating a recovery VM for a primary machine. The recovery VM is stored in a cache file in a kernel of an operating system. Data in the cache file is stored in a format readable by the virtual hypervisor. For example, the data in the cache file may be VMDK or VHD/VHDX, but are not limited to these file formats. The recovery VM may be provided from the cache file in the kernel of the operating system upon request when the primary machine fails without conversion of the data in the cache file. Thus, because the cache file is already in a file format (VMDK or VHD/VHDX) readable by the virtual hypervisor, the data does not have to be converted to this format. Thus, the recovery VM may be provided very rapidly upon failure of the primary machine.

Figure 6:
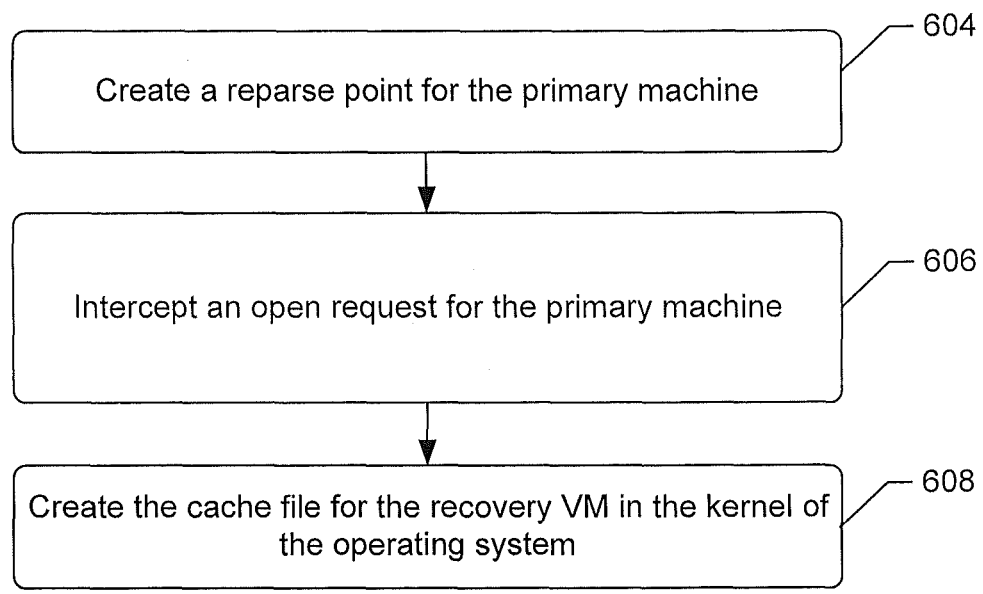

Referring now to FIG. 6, operations for creating the recovery VM begin at block 604 by creating a reparse point for the primary machine. Creating the reparse point for the primary machine includes associating the primary machine with a unique tag in a corresponding backup VM session. As discussed above, in addition to the recovery VM, a traditional backup VM is also created using, for example, D2D sessions. The reparse point for the primary machine contains a unique tag and data which is interpreted by a file system mini-filter in accordance with some embodiments discussed herein. The file system mini-filter is identified by the reparse tag.

A program, such as hypervisor or Explorer, calls the primary machine, i.e. opens the primary machine image. The call to open (open request) the primary machine passes through the object manager and the input output (I/O) manager and is intercepted by a driver, which identifies the reparse point for the primary machine by the reparse tag associated therewith. Thus, the open request for the primary machine is intercepted at an instant VM driver in the kernel of the operating system (block 606). A cache file is created for the recovery VM in the kernel of the operating system (block 608). In some embodiments, the cache has already been created because the primary machine has been previously called. In these embodiments, the driver just opens the existing cache file.

Figure 7:
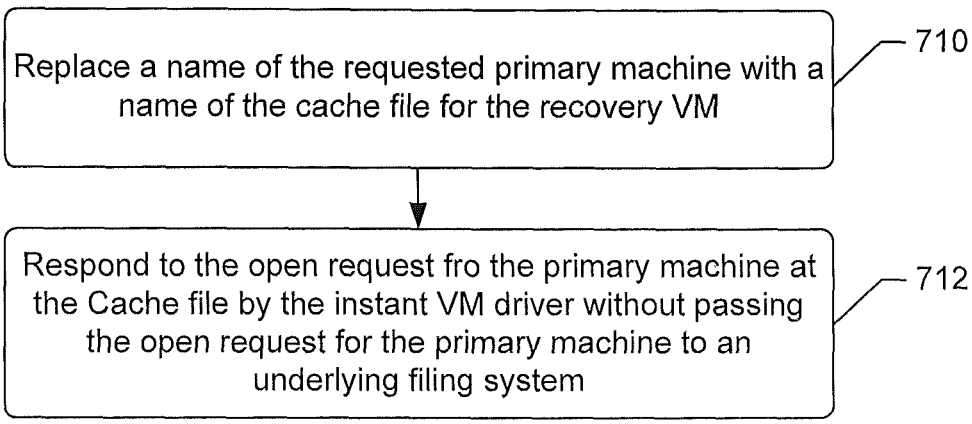

Referring now to FIG. 7, operations for creating the cache file continue at block 710 by replacing a name of the requested primary machine with a name of the cache file for the recovery VM based on the unique tag associated with the primary machine. Thus, the open request for the primary machine is handled at the cache file by the instant VM driver without passing the open request for the primary machine to an underlying filing system (block 712).

Figure 8:
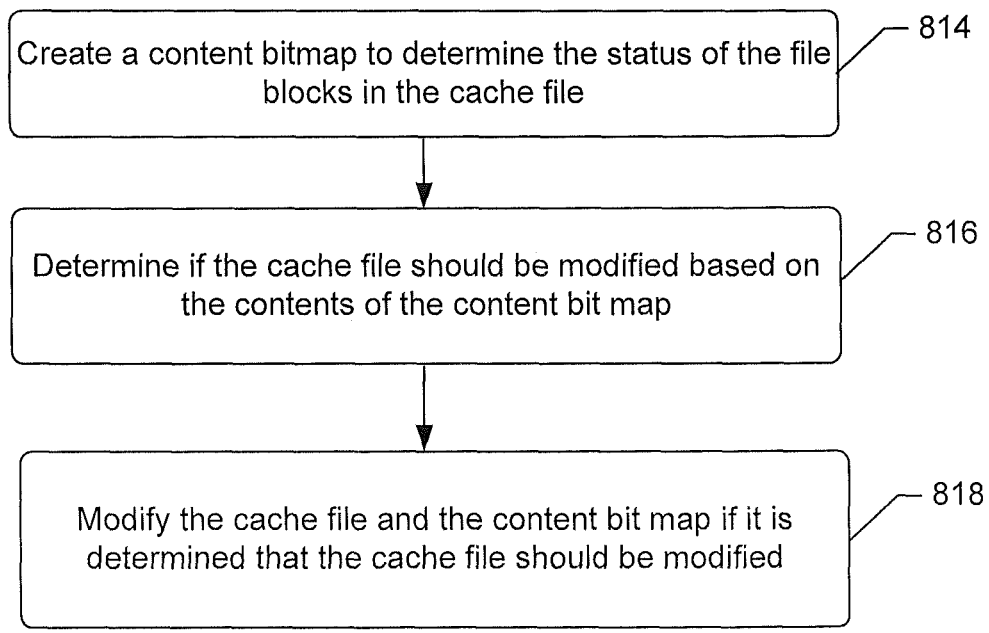

Referring now to FIG. 8, operations for creating a recovery VM continue at block 814 by creating a content bitmap to determine status of file blocks in the cache file. The status may include, for example, read, not read, modified and the like. An example content bitmap is provided in FIG. 12 of the present application. The contact bitmap may be used to determine if the cache file should be modified based on contents of the content bitmap (block 816). The cache file and the content bitmap may be modified if it is determined that the cache file should be modified (block 818).

In particular, as illustrated in FIG. 12, the content bitmap associated with the cache file may be used to track whether the file blocks in the cache file have been read or not from the D2D sessions, have been modified and the like. For example, the cache file may initially include all the information in the primary machine (is an image of the primary machine), thus, once read these original blocks of data from the primary machine are indicated in the bitmap as "read" and some blocks are indicated as "not read." The status of the data blocks may be communicated by a series of 0s and 1s as illustrated in FIG. 12, although embodiments of the present inventive concept are not limited to this configuration.

Figure 9:
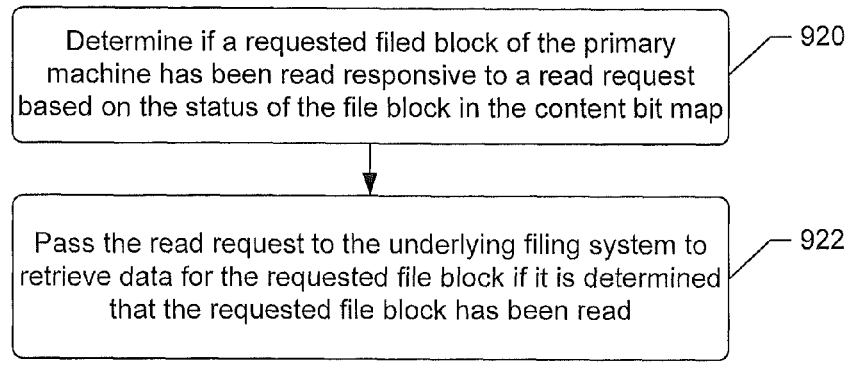

Referring now to FIG. 9, operations for modifying the cache file begin by determining if a requested file block of the primary machine has been read responsive to a read request based on the status of the file block in the content bitmap (block 920). If it is determined that the requested file block has been read, the read request is passed to the underlying filing system to retrieve data for the requested file blocks (block 922). In particular, in a pre-read callback, the driver retrieves the file blocks not read, for example, via the Agent. If the requested file blocks are marked as "read", the driver passes the read I/O to the underlying file system to retrieve the data from there.

Figure 10:
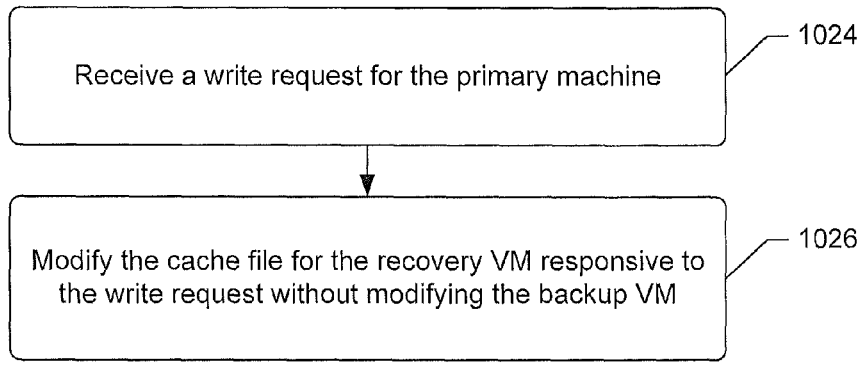

Referring now to FIG. 10, operations for modifying the cache file continue at block 1024 by receiving a write request for the primary machine. The cache file for the recovery VM is modified responsive to the write request without modifying the backup VM (block 1026). In other words, when a write operation is performed, the data in the cache file may be modified accordingly, but the data in the actual backup VM (D2D session) is not modified so that the backup VM stays intact. This modification of data blocks may also be tracked in the bitmap associated with the cache file as illustrated in FIG. 12.

In some embodiments of the present inventive concept, for example, the Agent, may be configured to apply a threshold to the cache file such that the cache file will not exceed its limit. For example, a sparse file may be used to keep the cache file from exceeding the threshold. A sparse file is a type of computer file that attempts to use file system space more efficiently when blocks allocated to the file are mostly empty. This may be achieved by writing brief information (metadata) representing the empty blocks to disk instead of the actual "empty" space which makes up the block, using less disk space. The full block size is written to disk as the actual size only when the block contains "real" (non-empty) data. When reading sparse files, the file system transparently converts metadata representing empty blocks into "real" blocks filled with zero bytes at runtime. The application is unaware of this conversion. Most modern file systems support sparse files, including most UNIX variants and NTFS. Finally, a write I/O is directed to the cache file 497, but will not be synchronized back to the D2D session to preserve the backup file.

Figure 11:
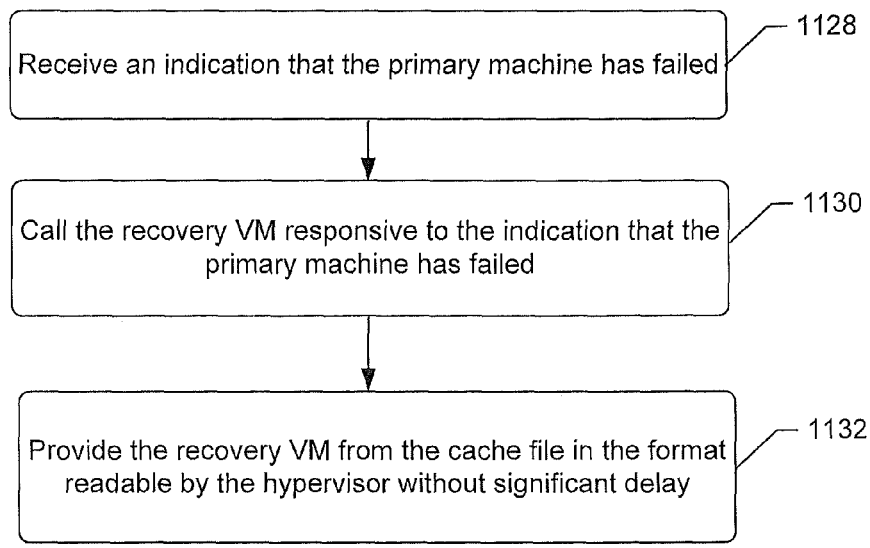

Referring now to FIG. 11, operations for providing the recovery VM begin at block 1128 by receiving an indication that the primary machine has failed. For example, a user may call the primary machine, either a physical machine or a virtual machine, and the primary machine may have failed. Thus, the recovery VM in accordance with some embodiments discussed herein may be called responsive to the indication that the primary machine has failed (block 1130). The recovery VM may be provided from the cache file in the format readable by the hypervisor without significant delay (block 1132). As discussed above, as used herein "without significant delay" refers to a delay that is less than the delay that would be caused by having to translate the data in a file to a format that is directly readable by the hypervisor.

Accordingly, as discussed briefly above, embodiments of the present inventive concept use a file system mini-filter to reparse the VMDK or VHD/VHDX data to other files with different formats, for example, D2D session. As further discussed above, a cache file in the kernel allows a write I/O to modify the "fake" VMDK or VHD/VHDX file without affecting the backups, for example, the D2D sessions.

Further Definitions and Embodiments

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented in entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present inventive concept may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present inventive concept are described herein with reference to flowchart illustrations and/or block diagrams of methods, apparatus (systems), and computer program products according to embodiments of the inventive concept. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the inventive concept. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described in order to best explain the principles of the inventive concept and the practical application, and to enable others of ordinary skill in the art to understand the inventive concept with various modifications as are suited to the particular use contemplated.

The invention claimed is:

1. A resource management node comprising:
a processor; and
a memory coupled to the processor and comprising computer readable program code that when executed by the processor causes the processor to perform operations comprising:
for each of a plurality of primary machines, creating a recovery virtual machine (VM) for a primary machine, the recovery VM being stored in a cache file in a kernel of an operating system and data in the cache file being stored in a format readable by a virtual hypervisor;
repeatedly modifying the cache file to correspond to modifications made to the primary machine;
maintaining a backup VM session that remains unmodified relative to modifications of the primary machine; and
providing the recovery VM from the cache file in the kernel of the operating system upon request when the primary machine fails without conversion of the data in the cache file.

2. The resource management node of claim 1, wherein creating a recovery VM comprises:

creating a reparse point for the primary machine, wherein creating the reparse point comprises associating the primary machine with a unique tag in a corresponding backup VM session;

intercepting an open request for the primary machine at an instant VM driver in the kernel of the operating system; and creating the cache file for the recovery VM in the kernel of the operating system.

3. The resource management node of claim 2, wherein the backup VM session comprises a disk to disk (D2D) session.

4. The resource management node of claim 2, wherein creating the cache file further comprises:

replacing a name of the requested primary machine with a name of the cache file for the recovery VM based on the unique tag associated with the primary machine; and responding to the open request for the primary machine at the cache file by the instant VM driver without passing the open request for the primary machine to an underlying filing system.

5. The resource management node of claim 4, wherein creating a recovery VM further comprises:

creating a content bitmap to determine status of file blocks in the cache file;

determining if the cache file should be modified based on contents of the content bitmap; and modifying the cache file and the content bitmap if it is determined that the cache file should be modified.

6. The resource management node of claim 5, wherein modifying the cache file further comprises:

determining if a requested file block of the primary machine has been read responsive to a read request based on the status of the file block in the content bitmap; and passing the read request to the underlying filing system to retrieve data for the requested file block if it is determined that the requested file block has been read.

7. The resource management node of claim 5, wherein modifying the cache file further comprises:

receiving a write request for the primary machine; and modifying the cache file for the recovery VM responsive to the write request without modifying the backup VM.

8. The resource management node of claim 1, further comprising providing a threshold for the cache file such that the cache file does not exceed a size limit of the cache file.

9. The resource management node of claim 1, wherein providing the recovery VM further comprises:

receiving an indication that the primary machine has failed;

calling the recovery VM responsive to the indication that the primary machine has failed; and providing the recovery VM from the cache file in the format readable by the hypervisor without significant delay.

10. A method of operating a resource management node comprising:

for each of a plurality of primary machines, creating a recovery virtual machine (VM) for a primary machine, the recovery VM being stored in a cache file in a kernel of an operating system and data in the cache file being stored in a format readable by a virtual hypervisor;

repeatedly modifying the cache file to correspond to modifications made to the primary machine;

maintaining a backup VM session that remains unmodified relative to modifications of the primary machine; and providing the recovery VM from the cache file in the kernel of the operating system upon request when the primary machine fails without conversion of the data in the cache file.

11. The method of claim 10, wherein creating a recovery VM comprises:

creating a reparse point for the primary machine, wherein creating the reparse point comprises associating the primary machine with a unique tag in a corresponding backup VM session;

intercepting an open request for the primary machine at an instant VM driver in the kernel of the operating system; and creating the cache file for the recovery VM in the kernel of the operating system.

12. The method of claim 11, wherein creating the cache file further comprises:

replacing a name of the requested primary machine with a name of the cache file for the recovery VM based on the unique tag associated with the primary machine; and responding to the open request for the primary machine at the cache file by the instant VM driver without passing the open request for the primary machine to an underlying filing system.

13. The method of claim 11 wherein creating a recovery VM further comprises:

creating a content bitmap to determine status of file blocks in the cache file;

determining if the cache file should be modified based on contents of the content bitmap; and modifying the cache file and the content bitmap if it is determined that the cache file should be modified.

14. The method of claim 13, wherein modifying the cache file further comprises:

determining if a requested file block of the primary machine has been read responsive to a read request based on the status of the file block in the content bitmap; and passing the read request to the underlying filing system to retrieve data for the requested file blocks if it is determined that the requested file block has been read.

15. The method of claim 13, wherein modifying the cache file further comprises:

receiving a write request for the primary machine; and modifying the cache file for the recovery VM responsive to the write request without modifying the backup VM.

16. The method of claim 10, wherein providing the recovery VM further comprises:

receiving an indication that the primary machine has failed;

calling the recovery VM responsive to the indication that the primary machine has failed; and providing the recovery VM from the cache file in the format readable by the hypervisor without significant delay.

17. A computer program product comprising:

a computer readable storage medium having computer readable program code embodied in the medium, the computer readable program code comprising:

in each of a plurality of primary machines, computer readable program code to create a recovery virtual machine (VM) for a primary machine, the recovery VM being stored in a cache file in a kernel of an operating system and data in the cache file being stored in a format readable a virtual hypervisor;

computer readable program code to repeatedly modify the cache file to correspond to modifications made to the primary machine;
computer readable program code to maintain a backup VM session that remains unmodified relative to modifications of the primary machine; and
computer readable program code to provide the recovery VM from the cache file in the kernel of the operating system upon request when the primary machine fails without conversion of the data in the cache file.

18. The computer program product of claim 17, wherein the computer readable program code to create comprises:
computer readable program code to create a reparse point for the primary machine, wherein creating the reparse point comprises associating the primary machine with a unique tag in a corresponding backup VM session;
computer readable program code to intercept an open request for the primary machine at an instant VM driver in the kernel of the operating system; and
computer readable program code to create the cache file for the recovery VM in the kernel of the operating system.

19. The computer program product of claim 18, wherein the computer readable program code to create the cache file further comprises:
computer readable program code to replace a name of the requested primary machine with a name of the cache file for the recovery VM based on the unique tag associated with the primary machine; and
computer readable program code to response to the open request for the primary machine at the cache file by the instant VM driver without passing the open request for the primary machine to an underlying filing system.

20. The computer program product of claim 19, wherein the computer readable program code to provide the recovery VM further comprises:
computer readable program code to receive an indication that the primary machine has failed;
computer readable program code to call the recovery VM responsive to the indication that the primary machine has failed; and
computer readable program code to provide the recovery VM from the cache file in the format readable by the hypervisor without significant delay.

\* \* \* \* \*